United States Patent
Ebert

(10) Patent No.: US 7,451,582 B2
(45) Date of Patent: Nov. 18, 2008

(54) CLIP MACHINE

(75) Inventor: Detlef Ebert, Bad Nauheim (DE)

(73) Assignee: Poly-clip System GmbH & Co. KG (DE)

( * ) Notice: Subject to any disclaimer, the term of this patent is extended or adjusted under 35 U.S.C. 154(b) by 174 days.

(21) Appl. No.: 11/419,631

(22) Filed: May 22, 2006

(65) Prior Publication Data

US 2006/0292970 A1 Dec. 28, 2006

(30) Foreign Application Priority Data

Jun. 23, 2005 (DE) .................. 10 2005 029 227

(51) Int. Cl.
*B65B 51/04* (2006.01)
(52) U.S. Cl. .............. 53/138.4; 53/138.2; 53/138.3
(58) Field of Classification Search ......... 53/138.2, 53/138.3, 138.4; 29/243.56, 243.57; 100/272
See application file for complete search history.

(56) References Cited

U.S. PATENT DOCUMENTS

| | | | | |
|---|---|---|---|---|
| 2,880,419 A | * | 4/1959 | Tipper ................... 53/138.4 |
| 3,061,838 A | | 11/1962 | Keine |
| 3,377,692 A | | 4/1968 | Keine |
| 3,383,746 A | * | 5/1968 | Narduzzi et al. .......... 53/138.4 |
| 3,791,191 A | * | 2/1974 | Baldyga .................. 100/272 |
| 3,926,033 A | * | 12/1975 | Forichon ................. 100/272 |
| 4,031,592 A | | 6/1977 | Schnell |
| 4,083,164 A | * | 4/1978 | Hagedorn ................ 53/138.4 |
| 4,448,119 A | * | 5/1984 | Williamson .............. 100/272 |
| 4,934,173 A | * | 6/1990 | Bakermans et al. ....... 100/272 |
| 5,136,824 A | * | 8/1992 | Niedecker ................ 53/138.4 |
| 6,101,785 A | | 8/2000 | Bienert et al. |
| 6,871,474 B2 | | 3/2005 | Toepfer |

FOREIGN PATENT DOCUMENTS

| | | |
|---|---|---|
| CH | 588 381 | 5/1977 |
| DE | 15 11 754 B2 | 8/1969 |
| DE | 197 38 298 C1 | 4/1999 |
| DE | 101 31 807 C1 | 11/2002 |

OTHER PUBLICATIONS

European Search Report from corresponding foreign patent application.

* cited by examiner

*Primary Examiner*—Louis K Huynh
(74) *Attorney, Agent, or Firm*—Hahn Loeser & Parks LLP; Michael H. Minns

(57) ABSTRACT

A clip machine comprising a pivotable closing lever having a first closing tool and including a feeder feeding clips into the first closing tool, a second closing tool slidably disposed along linear guide tracks on a linear carriage guide, wherein the first closing tool and the second closing tool are movable relative to each other between an open position and a closed position in order to close clips, a drive controller for the closing tools that is configured in such a way that first the first closing tool and then the second closing tool is moved into the closed position, and an adjusting mechanism designed to set the neutral position of the second closing tool and hence the gap between the closing tools.

7 Claims, 3 Drawing Sheets

CLIP MACHINE

This patent application claims priority to German patent application DE 10 2005 029 227.5-27, filed Jun. 23, 2005, hereby incorporated by reference.

TECHNICAL FIELD

The invention relates to a clip machine comprising a closing lever, a first closing tool arranged on said closing lever and pivotable with same, a second closing tool, wherein the first closing tool and the second closing tool are movable relative to each other between an open position and a closed position in order to close clips, a drive controller for the closing tools that is configured in such a way that first the first closing tool and then the second closing tool is moved into the closed position, and adjusting means designed to set the neutral position of the second closing tool and hence the gap between the closing tools, in particular in their closed position (closure gap).

BACKGROUND OF THE INVENTION

Clip machines of the kind referred to are typically used to close bags, pouches, or tubular fill-and-seal packaging (also called casings or gut) filled with a material of liquid to thick pasty consistency, or (in some cases) with granular material. During such an operation, the filling is first introduced into the packaging and in the case of tubular fill-and-seal packaging is subsequently divided into portions by means of displacement elements. Said displacement elements gather and tie the tubular casing in the radial direction and displace the filling in the constriction in the axial direction with respect to the axis of the tube. In the area where the casing is gathered and tied, a braid of casing material is formed. In the next operating cycle, one clip, or in the case of a double clip arrangement two clips are applied to the gathered casing by means of two (or four) closing tools moved against each other. To achieve this, the first closing lever and a second closing lever for the second closing tool are pivoted out of their open position about what is usually a common pivot axis into the closed position. Each pair of closing tools comprises a punch and a die, between which the clip is shaped until the closed position is reached (the reversal point of movement). Once the packaging has been clipped, the closing tools are returned to their initial or open position by pivoting the closing levers from their closed position back into the open position.

Such clip machines mostly have a crank drive or a cam drive for moving the closing levers, wherein a control curve on a cam disk is picked up by means of a cam roller. To transfer this movement to the closing lever, a simple lever or toggle joint mechanism is used, for example, said lever or toggle joint mechanism being flexed in the open position and straightened in the closed position.

The clip machines of the kind initially described typically use clips made of an embossed aluminum wire strand and each integrally interconnected at the ends of the clip legs in such a way that they span a common plane, the clip plane. The clips are fed in this manner to the closing tools. In the prior art, this occurs along a guide track provided on the (lower) closing lever for the first closing tool, said guide track beginning near the pivot axis of the closing lever and leading to the region of the associated closing tool.

When in the prior art such a chain of clips is transported, the frontmost clip is fed to the first (lower) closing tool by an intermittently engaging feeding means. As long as the frontmost clip is still attached to the chain of clips it is followed by, it is stably held by the latter in the lower closing tool, which is typically in the form of a die.

The pivoting movements of the closing levers are performed with a time shift by means of the drive controller—for example in the form of offset curves on a cam disk and/or by means of an electronic timing control. The lower closing lever is first pivoted into its (upper) closed or end-of-stroke position. In said position, the frontmost clip is pressed against the gathered end of the casing and clamped between the latter and the closing tool. With a time shift, i.e. while the lower closing lever is still in this position, the second (upper) closing tool moves onto the lower closing tool by pivoting about the same pivot axis.

Immediately before the clip is closed, the frontmost clip is separated in this manner from the chain of clips following it, at first by means of a shearing device provided on the closing tools. At this moment, the frontmost clip is free and is pressed against the lower closing tool only by the tension of the gathered end of the casing. The clip is then deformed by the upper closing tool coming closer to the lower closing tool, until the closing tools are the clip height apart and the clip is closed around the gathered end of the casing.

When the clip machine is to be used for many different sausage products and casings, different clips adapted for the respective requirements are applied which differ in respect of both strength and size, e.g. in their leg length and/or thickness of material. The closure gap must be adjusted accordingly, because this is the critical size—referred to hereinafter as the clip height - to which the clip is pressed together during closure. In the prior art, this is achieved by changing the neutral position of at least one of the closing tools, and hence the closure gap. The preferable adjusting means is an adjustable coupling point on the counter bearing of the toggle lever for the second closing tool.

If differently sized clips are used and the closed position is adjusted for this purpose, then the angle between the two closing levers, movable relative to each other, changes. As a consequence, and depending on the leg length of the undeformed clip, the upper closing tool does not engage simultaneously with the two legs. This is shown in very simplified form in FIG. 3, in which the fixed angular position of the lower, non-adjustable closing lever in each case is shown by lines 310, 320 and 330. The angular position of the adjustable upper closing lever is represented in each case by lines 312, 322 and 332. By way of illustration, the drawings show in exaggerated form the position of the closing tools at that moment when the second closing tool (punch) first contacts clips of three different sizes.

In FIG. 3A, one can see that, in the case of a large clip 314, the second closing tool first comes into contact with the inner leg of clip 314 closer to the pivot axis. When the clip is being closed, a torque shown by arrow 316 is first exerted on clip 314. This causes instability of the clip, which after all had already been separated from the chain of clips behind it. In the case of the medium-sized clip 324 in the example shown in FIG. 3B, both legs are contacted simultaneously by the second closing tool 323. Forces are therefore exerted evenly on clip 324 during closure, see arrows 326, and the clip is stabilized in its position when pressed against the first closing tool (die). In the case of a small clip 334, as shown in FIG. 3C, force is applied first to the side further from the pivot axis, and the clip is similarly liable to tilt because of the resultant torque, shown by arrow 336.

It is essential to avoid such uncontrolled tilting moments or torques, which act upon the separated clip and for that reason are a source of error, and thus to make the clip closure process more secure.

SUMMARY OF THE INVENTION

In a clip machine of the kind initially specified, the object is achieved according to the invention by the second closing tool being arranged along linear guide means and movable relative to the first closing tool, in order to close clips and to set its neutral position.

Since no adjusting means for the neutral position of the first closing tool are provided according to the invention, the closed position of the latter is defined by the reversal point of the closing lever movement. If the second closing tool is moved linearly, preferably directed perpendicularly onto a conceived line connecting the ends of the legs of a clip inserted into the first closing tool (the die), the source of error described in the foregoing is avoided, in that the angular position of the closing tools relative to each other is no longer modified when the first closing tool ends its pivoting movement. This is favored when the drive controller permits the second closing tool to be moved into the closed position with a time shift relative to the first closing tool. However, all that is important here is that the first closing tool reaches the closed position before the second closing tool does; their movements can otherwise overlap in time, or occur consecutively.

Although clip machines of a different type and with linear punch guides are known from DE 101 31 807, for example, these machines are based on a completely different kinematic concept and a different type of clip, and hence also on a different type of clip feeder. The clips used in such machines are arranged separately adjacent each other and with parallel clip planes, and are joined on their backs by means of a sealing strip to form chains of clips. Such clips are fed to a stationary clip entry window via a magazine chain. Located behind the clip entry window is the guide track of the die, which separates the frontmost clip from the chain of clips behind it when the closing movement is performed, and forces said clip - guided by the punch guide - onto the stationary die. This kinematic concept, which is commonly used for semi-automatic operation in smaller types of machine, is designed for only one specific clip size, however. In contrast, the kinematic concept of the clip machine according to the invention permits the use of different clip sizes.

BRIEF DESCRIPTION OF THE DRAWINGS

Other features and advantages of the clip machine according to the invention are derived from the subclaims. These shall now be explained in the following description of an embodiment of the invention, with reference to the enclosed Figures, in which:

DETAILED DESCRIPTION OF THE DRAWINGS

Figure 1:
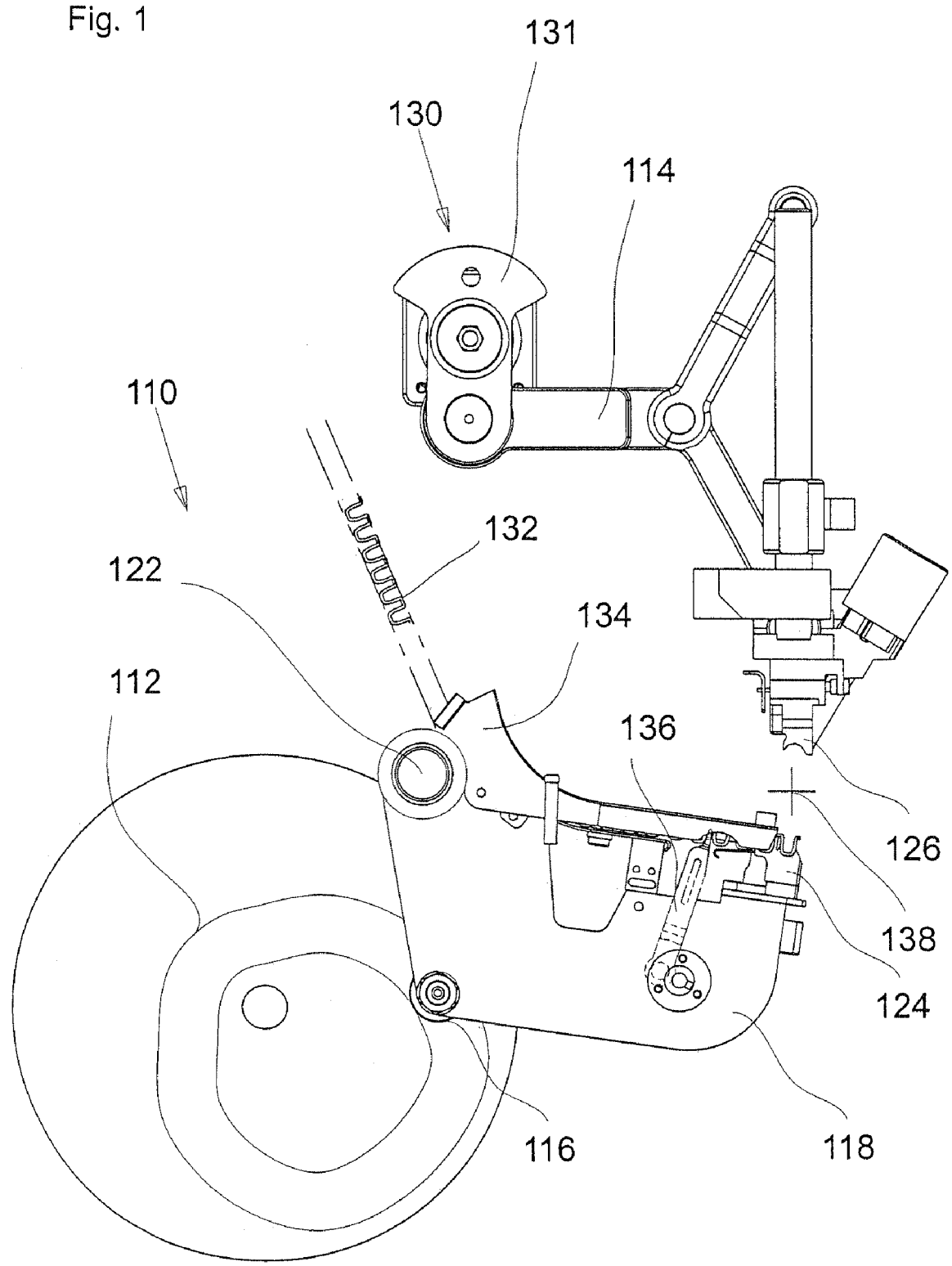
FIG. 1 shows a schematic view of the kinematic concept of the clip machine according to the invention.

The embodiment of clip machine shown in FIG. 1 has a first drive 110 with a cam disk 112, from which the movement for a lower closing lever 118 is taken by means of a cam roller 116. The clip machine also has a second drive 130, which includes a crank 131 from which the movement for a second upper closing tool 126 is taken by means of a lever arm 114.

Closing lever 118 is pivotably mounted on a pivot axis 122. At the end remote from pivot axis 122, it carries a first closing tool 124, which in the embodiment shown is a die.

A chain of clips 132 is fed from above to closing lever 118 and fed along a guide track 134 commencing on clip lever 118 near pivot axis 122 in the direction of die 124. On the front end of clip lever 118, a conveying means intermittently engaging with the chain of clips is disposed as a drive means for transporting chain of clips 132. Conveying means 136 raises the chain of clips at the end near die 124, pulls it forward in the direction of the die and in doing so places the frontmost clip into die 124.

The chain of clips is generally transported when the lower clip lever 118 is in the position shown, when the latter is in its open position. After the frontmost clip has been placed in the die, or while this is taking place, the pivoting movement of the lower clip lever 118 reverses direction, and the latter approaches the closed position. This is done by the cam disk control moving closing lever 118 upwards (as a result of curve 112 and any superimposed control of the motor drive), until die 124 with the inserted clip approaches to within a predefined distance from the axis of the casing, marked as cross 138. In this position, the frontmost clip is pressed against the gathered end of the casing and pressed into the die as a result of the pretension in the casing.

First and second closing tool 124, 126 each include shearing means that co-operate as a shearing device when the closing tools move towards each other into the closed position to detach the frontmost clip from the following chain of clips 132, before said frontmost clip is closed around the tubular casing. The clip is not detached until the lower closing lever 118 has already reached its closed position, so that the frontmost clip is held in the die by the gathered end of the casing. For this reason, a drive controller is provided which permits the second closing tool, punch 126, to move with a time shift in the direction of tubular casing axis 138.

As explained in the following with reference to FIG. 2, upper closing tool 226 is moved along linear guide means 220 relative to the first closing tool, not only to close clips between the open position shown in FIG. 1 and the closed position, but also to adjust the neutral position.

The second closing tool 226 is mounted on a linear carriage guide 221, which is forcibly guided on a linear track by means of two guide rails 222, 224 and in combination with said guide rails forms linear guide means 220. The guide means are aligned in such a way that second closing tool 126 performs a movement which is directed at tube axis 138, cf. FIG. 1.

The movement derived from drive 230 via lever 214 is transferred via a toggle joint mechanism 240 to carriage guide 220. Lever 214 acts on toggle joint 242 of toggle joint mechanism 240 and straightens or flexes said joint. Toggle joint mechanism 240 comprises a first lever 244, the remote end of which from toggle joint 242 is pivotably mounted on carriage guide 220, and a second lever 245, the remote end of which from toggle joint 242 is pivotably mounted to a movable support (not shown) which can be adjusted in the direction of linear guide means 220. By means of the adjustment, marked by a double-headed arrow 246, the neutral position of the second closing tool 226 and hence its spacing from first closing tool 124 is adjusted in the closed position to the respective clip height.

Figure 2:
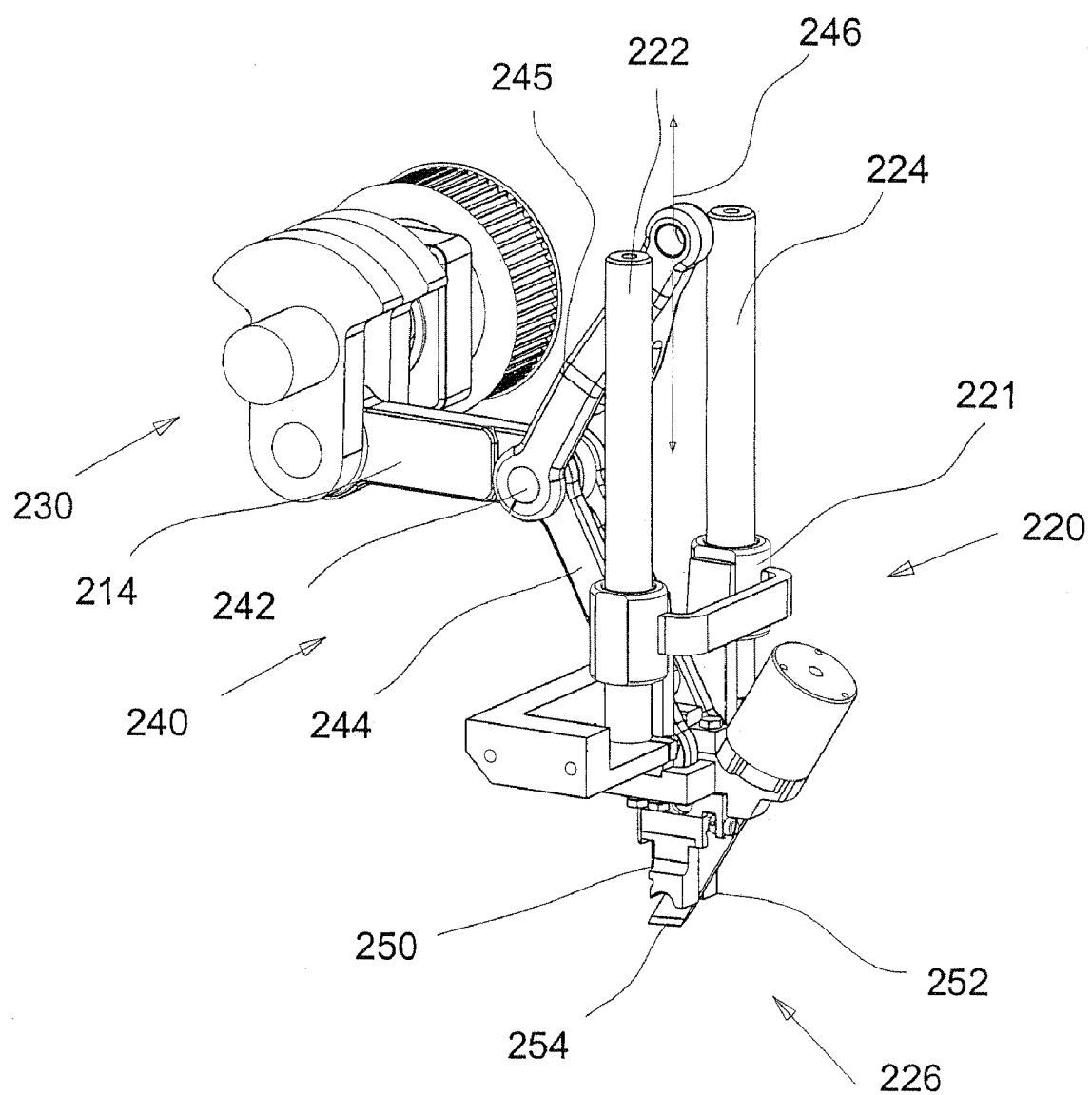
FIG. 2 shows the guide mechanism for the second closing tool, in a perspective view of a section of an embodiment of the clip machine according to the invention.
Figure 3A:
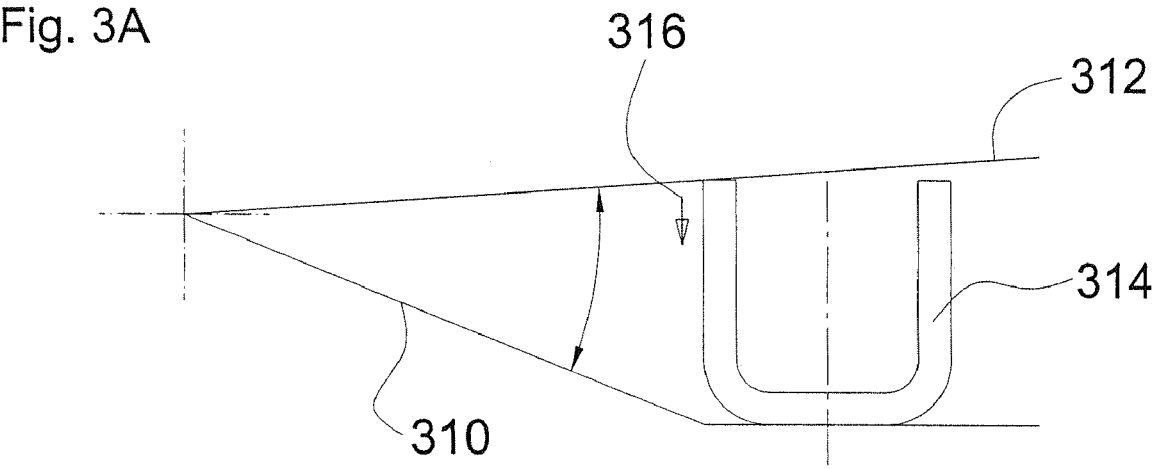
FIG. 3 shows a schematic view of how the clip size affects the reliability of the process when a clip is closed using a prior-art clip machine.
Figure 3B:
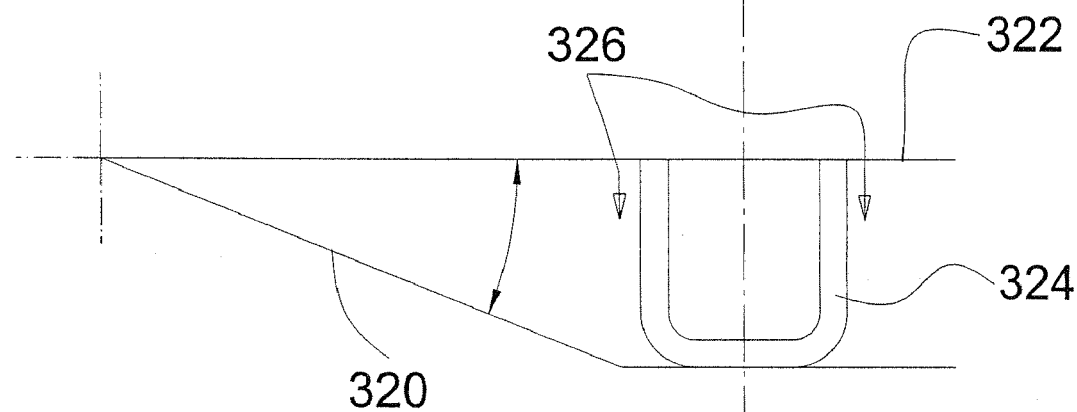
Figure 3C:
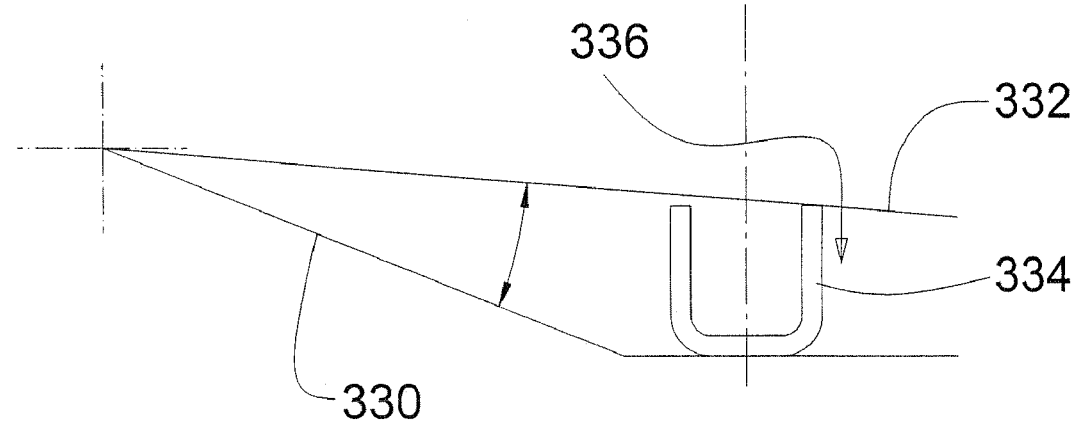

In the perspective view shown in FIG. 2, it can also be seen that second closing tool 226 comprises two punches 250, 252, between which a knife 254 is disposed. This double punch arrangement is matched with a corresponding double die arrangement on the closing lever. By means of such a double clip arrangement, two clips can be placed and closed simultaneously on a previously gathered end of the casing. The gathered end of the casing can subsequently be cut through by knife 254, thus separating the sausages from each other.

The invention claimed is:

1. A clip machine comprising:
    a closing lever,
    a first closing tool disposed on said closing lever and pivotable with said closing lever, the closing lever including a conveying means for conveying clips into the regions of the first closing tool;
    a second closing tool, wherein the first closing tool and the second closing tool are movable relative to each other between an open position and a closed position in order to close clips;
    a drive controller for the closing tools that is configured in such a way that first the first closing tool and then the second closing tool is moved into the closed position; and
    wherein the second closing tool is slidably disposed along linear guide means relative to the first closing tool on a linear carriage guide, the linear carriage guide being aligned perpendicular onto a line connecting the ends of legs of a clip inserted into the first closing tool.

2. The clip machine of claim 1, wherein the second closing tool is connected to a crank drive.

3. The clip machine of claim 2,
    wherein the force is transmitted by the crank drive via a toggle joint mechanism, the first lever of which is pivotably mounted on the linear carriage guide by the end which is remote from the shared toggle joint, and the second lever of which is pivotably mounted on the adjusting means configured as an adjustable counter-bearing by the end which is remote from the common toggle joint.

4. The clip machine of claim 1 wherein the closing lever includes a guide track for a chain of clips fed into the machine, said guide track opening into a region near the first closing tool.

5. The clip machine of claim 1, wherein the closing tools include shearing means configured to co-operate as a shearing device for separating a frontmost clip from a successive chain of clips immediately before the clip thus separated is closed.

6. The clip machine of claim 1, where the second closing tool includes a drive mechanism, the drive mechanism having a first lever and second lever, first ends of the first and second levers being pivotably connected to one another, a second end of the first lever being pivotably connected to the carriage.

7. The clip machine of claim 6, where a second end of the second lever is capable of being linearly adjusted relative to the carriage.

* * * * *